Dec. 23, 1969   R. GUIBERT   3,485,231
APPARATUS FOR BAKING
Filed Feb. 23, 1967   4 Sheets-Sheet 1

INVENTOR
RAUL GUIBERT
BY
James M. Heilman
ATTORNEY.

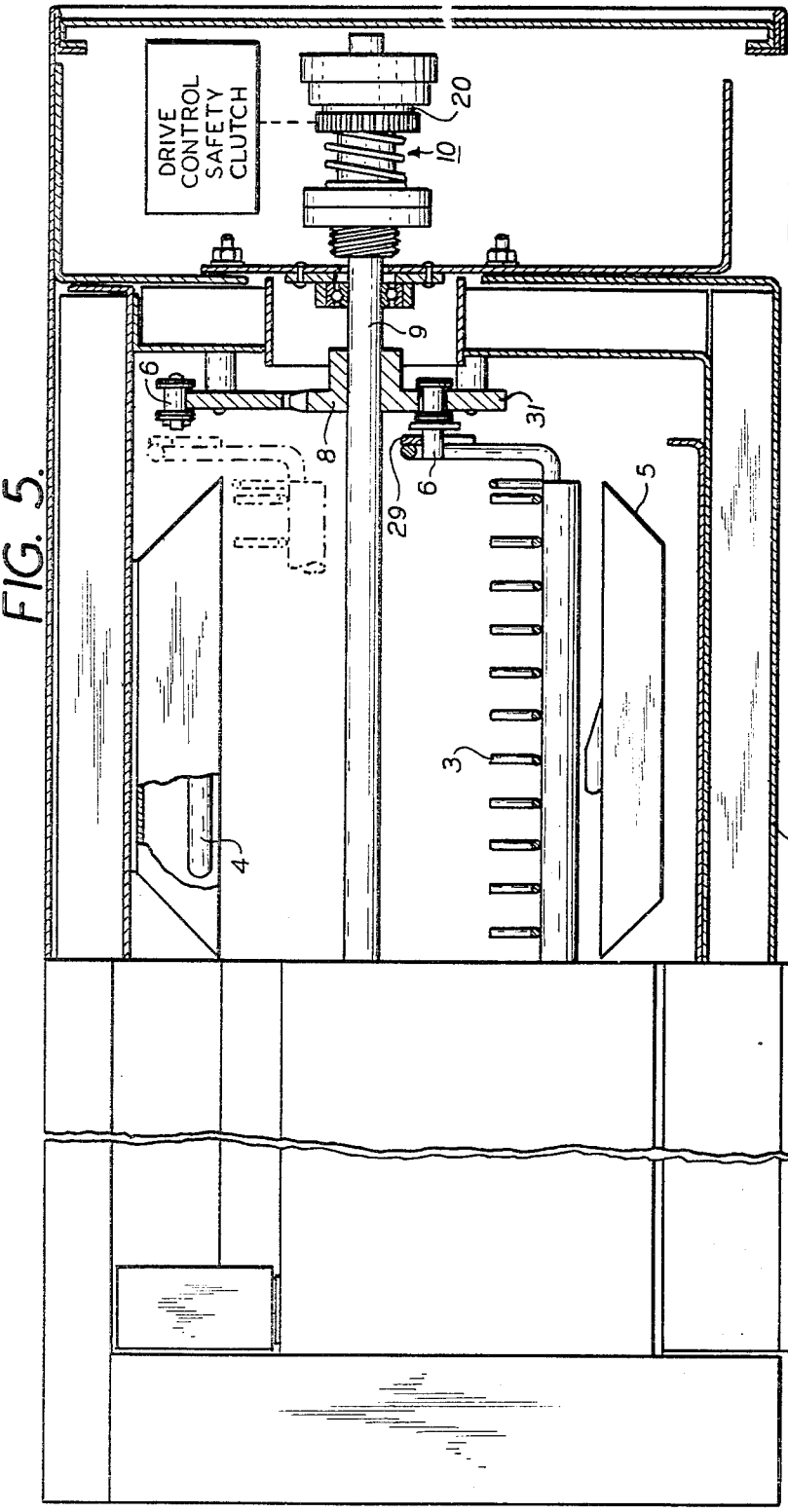
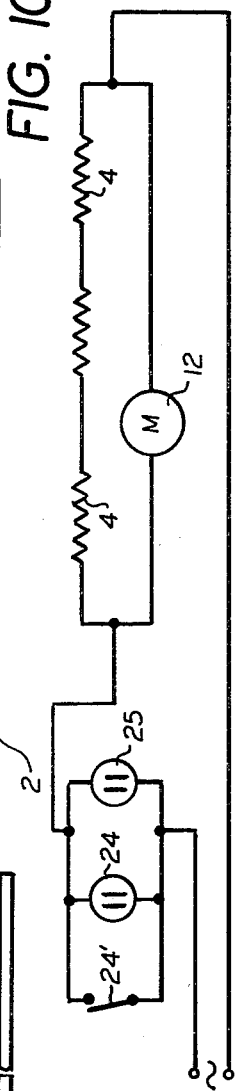

INVENTOR
RAUL GUIBERT
BY
ATTORNEY.

United States Patent Office 3,485,231
Patented Dec. 23, 1969

3,485,231
APPARATUS FOR BAKING
Raul Guibert, New York, N.Y., assignor to Westwood Manufacturing Company, Inc., a corporation of New Jersey
Filed Feb. 23, 1967, Ser. No. 618,153
Int. Cl. F24c 15/16
U.S. Cl. 126—338         6 Claims

ABSTRACT OF THE DISCLOSURE

This invention pertains to a method and apparatus for automatically and quickly heating frozen pizzas.

---

This invention more particularly relates to an automatic and rapidly heating or reconstituting apparatus and method for frozen pizzas and other food products. It eliminates the skilled labor previously required to insure a high quality product. However, whenever pizza is referred to throughout the specification and claims, all similarly associated foods are intended.

Normally, pizzas are made in large sizes, and unless a purchaser buys and eats the large pizza immediately after it is cooked, the remaining slices have to be sold when semi-hot, lukewarm, or even cold.

For example, this invention contemplates an operator taking a frozen pizza from a refrigerator or other storage place, and putting the pizza into the automatic counter-top oven or cooker of this invention. The operator can then forget the pizzas and do other counter chores until the required heating time, approximately two minutes, has elapsed, and return to serve the hot pizza.

This oven is compact. An oven producing 110 pies per hour, measures approximately 26" wide x 19" deep x 12" high. Preferably, my oven is constructed with an opening large enough to load at least two pizzas per tray, of which there are two trays, into the oven at one time through a single enlarged opening. The tops of the units are flat for a substantial area, and the sides are preferably substantially flat so that additional double units may be neatly positioned above or alongside the first unit.

The oven can be used alone as a counter-top oven, or can be used in conjunction with other food serving equipment, such as a refrigerator beneath the oven to store the frozen pizzas, shrimp, tomatoes, pepperoni, sausage, pork, anchovies, mushrooms, various cheeses, and other foods for special pizzas. Also a drink dispenser may be positioned beneath or alongside the oven or refrigerator to make a complete compact unitary assembly.

Other advantages are provided, such as an automatic switch-off of rear bottom heater if the half-cycle switch is actuated. This keeps the pizzas in process warm and delays the final cooking until the pie is to be eaten.

The machine of this invention is rapid and is equipped with a minimum of parts so that it is almost fool-proof in its operation.

Figure 1:
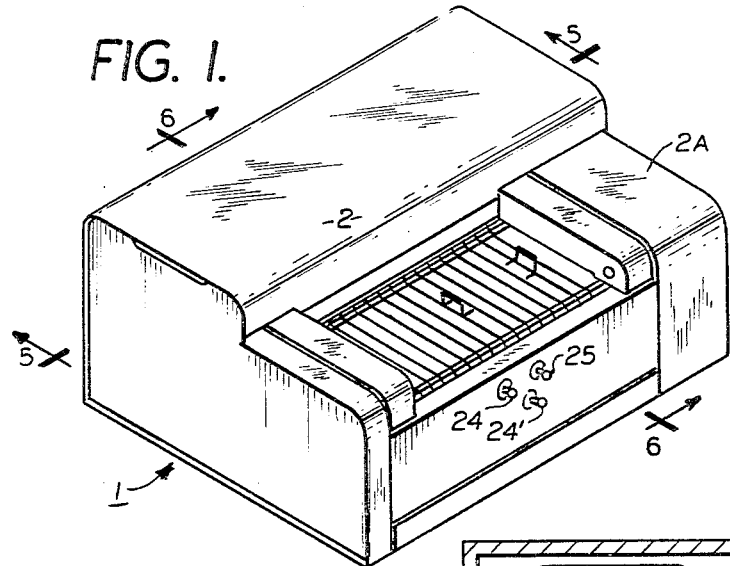
Figure 2:
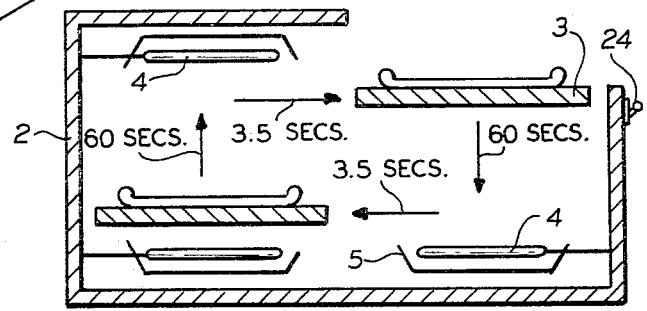
Figure 3:
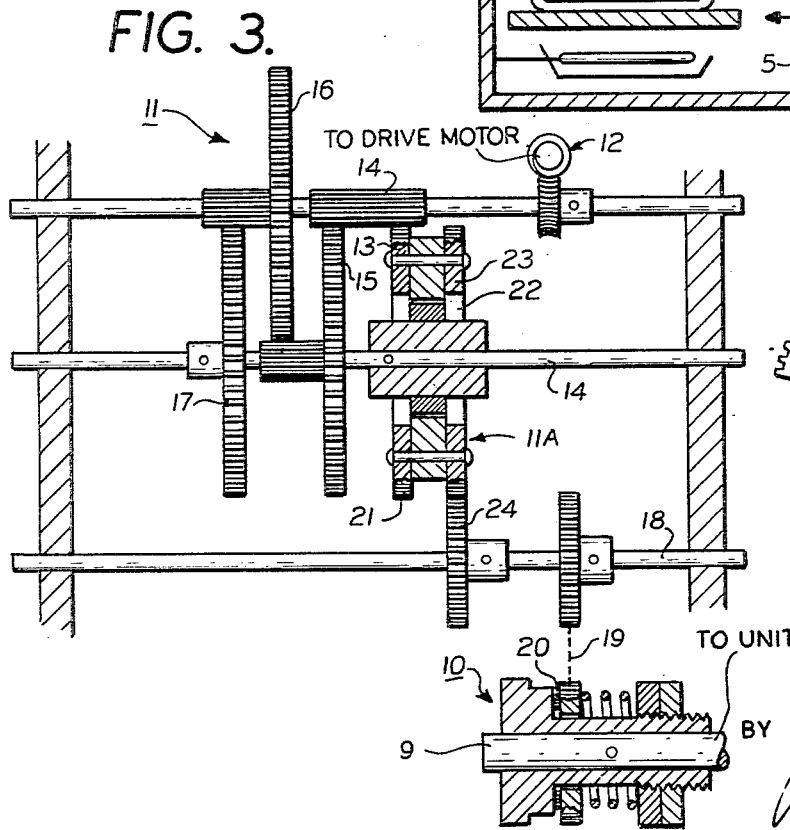
Figure 4:
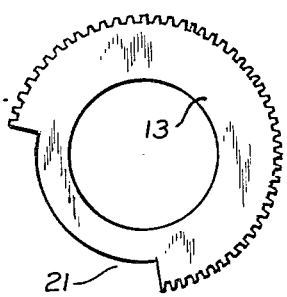
Figure 6:
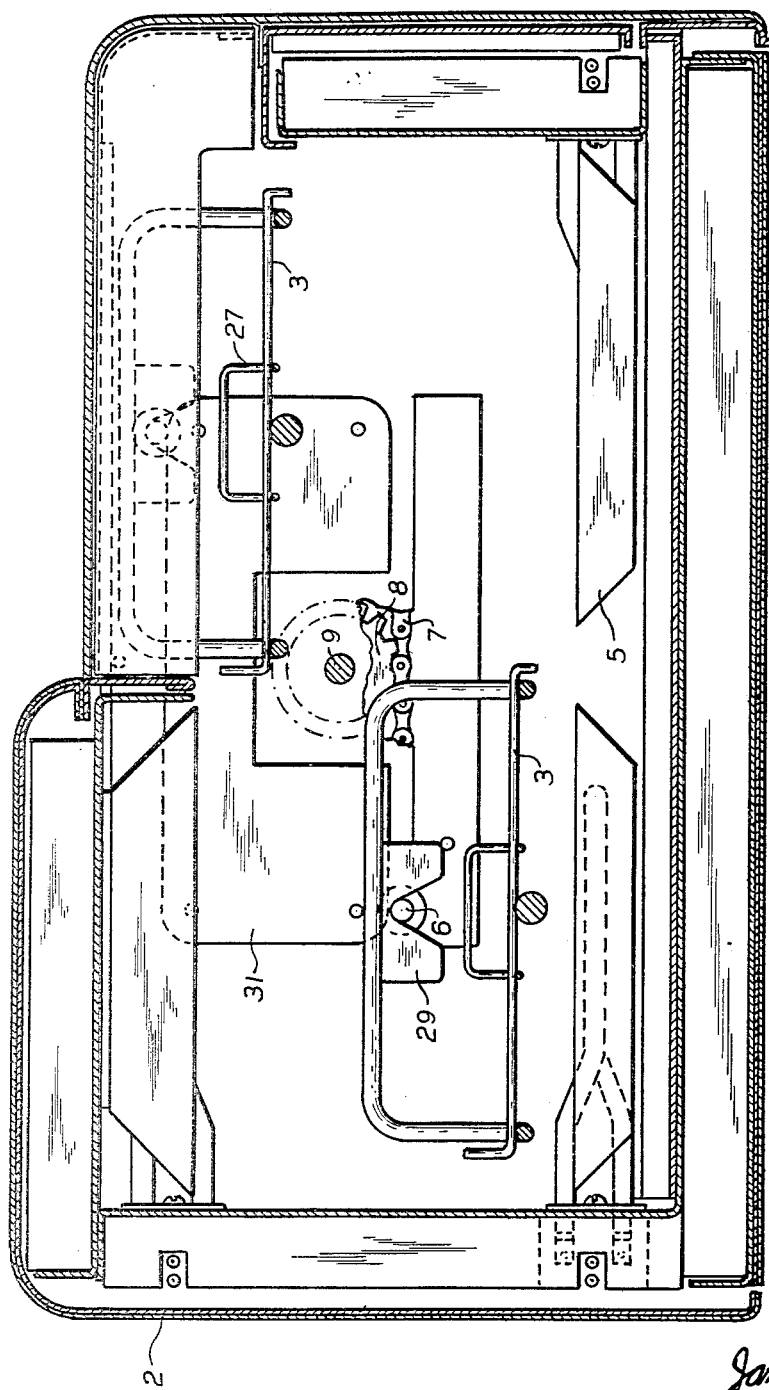
Figure 7:
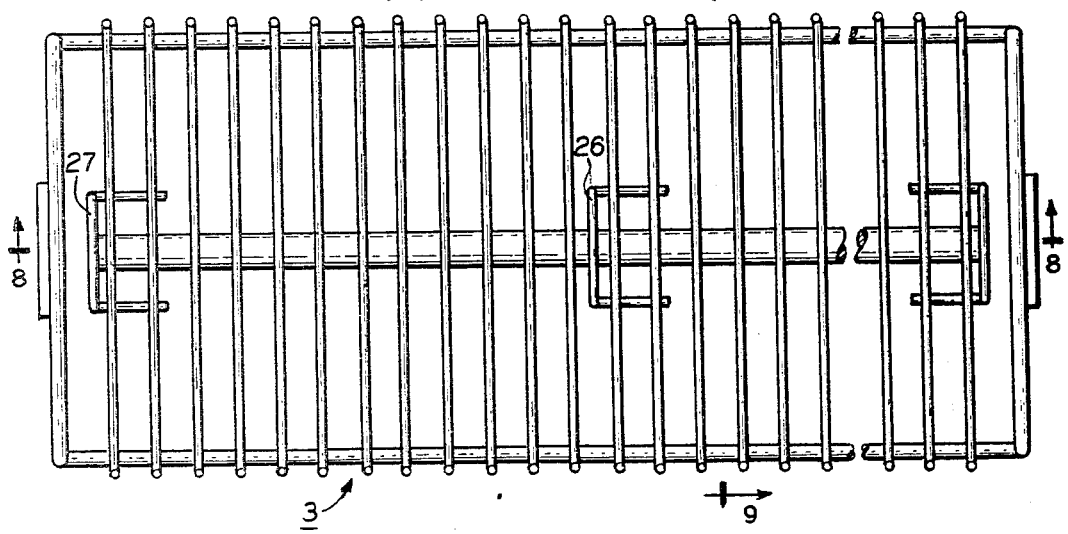
Figure 8:
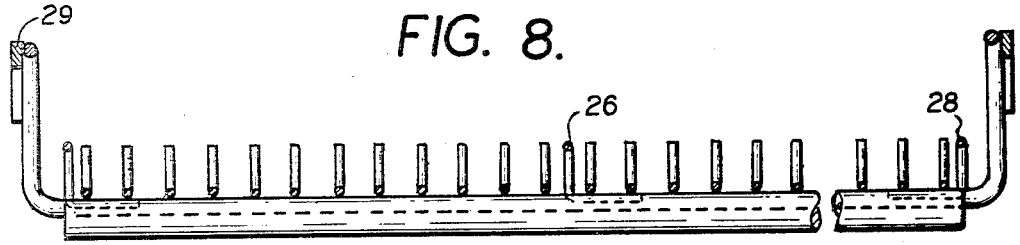
Figure 9:
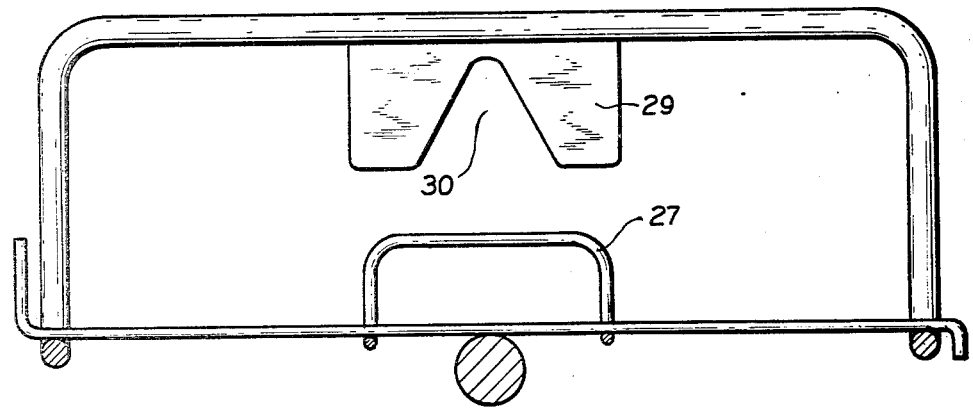

Referring generally to the figures:
FIG. 1 is a perspective view of one embodiment of my invention.
FIG. 2 is a schematic transverse view of the oven and showing time of unique cooking cycle.
FIG. 3 illustrates one type of drive control unit and safety clutch.
FIG. 4 shows the cut out alternating fast and slow driving gear.
FIG. 5 is a cross-sectional view taken on the line 5—5 of FIG. 1; the safety clutch assembly being reversed from the direction shown in FIG. 3.
FIG. 6 is a cross-sectional view taken on the line 6—6 of FIG. 1.
FIG. 7 is an enlarged view of one of the movable trays or shelves.
FIG. 8 is a cross-sectional view taken on the line 8—8 of FIG. 7.
FIG. 9 is a cross-sectional view taken on the line 9—9 of FIG. 7.
FIG. 10 illustrates one of a number of conventional electrical switches, in the apparatus, which control the operation of the heating elements and movement of the transmission.

Pizza is a very difficult product to cook correctly. This being a fact, the final heating or reconstitution of the precooked pizza is a difficult task. The taste of pizza is greatly influenced by heat and by the type and manner by which this heat is applied. This invention incorporates infrared heat arranged in a novel manner.

The bottom of the pizza or dough shell receives a far greater charge of heat than does the top so as to prevent the burning and overcooking of the tomato sauce and cheese. Consequently, the heating cycle or phase is divided into two stages or phases (FIG. 2). The first stage of approximately 60 seconds is a long exposure of the bottom to increasing intensity of the infrared coil. A further heating stage of similar duration is subsequently provided wherein as the heat on the bottom is decreased, the heat on the top is increased. Between these two heating phases there are two transferral phases, which serve to transport the pizzas to the different infrared heaters and delivery of the pizzas to be dispensed by the operator in the dispensing stopped position. Here the lower front heater is far enough from the tray to serve as a warming element to preserve the temperature of the already heated and reconstituted pizza, without further cooking, during the time the operator is busy elsewhere.

There are provided two timing switches or timing buttons, one (see FIGS. 1 and 10) of which, 24, provides for a full, complete cooking cycle of approximately 127 seconds, while button 25 provides for a preliminary heating half-cycle of approximately 63.5 seconds. The latter button would be used when there is no immediate call for the preliminary cooked product. Obviously, a single timing switch could be used and rotated to the desired time. Preferably, however, an electrical tripping device (not shown) could be positioned at the end of the half or full cycle. Also a continuously operating switch 24' could be provided if desired.

Referring specifically to FIGS. 1 and 2, numeral 1 refers broadly to the oven, while 2 refers to the oven casing and 2a the motor and drive housing. Within the casing there are preferably positioned 2 wire or perforated trays or shelves 3 which move over or under a series of infrared coils 4 connected either in series or parallel preferably, of 500 watts. Larger or smaller wattage coils may be used with a corresponding change in the timing of the heating phases. The heat to be supplied would be sufficient to cook the pizzas. A series of reflectors 5 direct the infrared rays through the trays to the food product to be heated and reconstituted.

Referring now specifically to FIGS. 5 and 6, the removable shelves 3 are supported by a carrier bolt 6 secured to and carried by a chain drive 7. The chain drive is moved by a chain driving gear 8 secured to a main drive shaft 9 near the center of the oven. The chain drive follows a rectangular guide (31 in FIG. 6) which imparts a rectangular path to the trays.

Main drive shaft 9 (see FIGS. 3 and 4) through a spring friction clutch indicated generally by numeral 10 and operating through a series of reducing gears in gear box 11 is driven by a motor shaft 12 of a conventional motor.

One of the features of this invention is the cut-out of the driving gear 13. It is movably secured on shaft 14 by an overrunning clutch 22 so as to permit the trays carrying the food product through the transfer phases to move at a rapid speed and during the heating phases to move at a slow speed.

As illustrated in FIG. 3, the motor shaft 12 actuates main drive shaft 9 of the oven through a spring operated, safety clutch device 10 and through a train of gears 11 provided with an overrunning clutch assembly 11A to permit alternately fast or slow speed. Power is delivered from motor shaft 12 to pinion gear 14 to the toothed portion of cut out gear 13. This gear through the overrunning clutch arrangement 22 will overrun the slow moving shaft 14, and through gear 23 and 24, and chain 19, and clutch 20 will move main driving shaft at a high speed. Alternatively, when the cut out 21 of gear 13 is moved adjacent the pinion 14, the reducing power train involving gears 15, 16 and 17 through shaft 14 will slowly carry gear 13 (and 23, 24, 19 and 9) until its teeth again engage pinion 14. If a single cut out is provided in gear 13, obviously two revolutions of the gear will be necessary to complete a full cycle for each tray. This is merely a matter of choice of speeds and gear arrangements.

The friction clutch assembly 10 (see FIG. 3, and in opposite direction in FIG. 5), is more or less conventional. Friction is applied to the head through two lock nuts and a compression spring operating through a friction clutch arrangement 20. Such a flexible clutch arrangement prevents damage to the motor, drive assembly and other parts of the machine if a stoppage or other accident occurs.

Referring to FIGS. 7 to 9, the trays are formed of a series of longitudinal and transverse wires having a separating wire 26 to separate the shell into separate sections and to position each pizza over the center of the infrared coils.

A hanger element 29, secured to one of the upstanding wires, has an inverted V-opening therein so that it can be removably positioned over the carrier bolt 6.

As can readily be seen, a food product, such as a pizza, can be placed on the open wire tray or shelf 3. Either the full cycle or the half-cycle button is pushed to start the machine through the heating cycle. If the full cycle button is pushed, the tray is returned to the starting point with the cooked product, and if the half-cycle button is pushed the tray stops over the bottom rear infrared coil, which is then switched off, until the half-cycle button is again pushed. At that time, all heating coils will be reactivated, and the first tray will have completed the full cycle.

Other modifications are readily apparent all within the inventive concept. For example, additional shelves could be provided on the chain (with proper adjustment of timing cycles), larger trays could be provided to hold three or more pizzas, etc.

The embodiments of the invention in which an exclusive property or privilege is claimed are defined as follows:

1. Means for heating a food product formed from a plurality of substances comprising a casing, heating means within said casing, convyeing means within said casing, a shelf removably secured to said conveying means, said conveying means being so constructed and arranged to move the food product so that the various substances of the food product are directly exposed to the heating means at different times; and wherein the conveying means comprises a flexible driving means, said flexible driving means operating through a closed rectangular path from a starting point, a series of carrier bolts secured to said chain at spaced intervals along its length, and shelves removably attached to said carrier belts; and wherein said conveying means comprises a link chain, a main drive shaft, means connecting said main drive shaft to said link chain, and a motor connected to said main drive shaft to rotate said drive shaft, and means intermediate said motor and said main drive shaft whereby to impart alternately a slow and a fast speed thereto.

2. Means as set forth in claim 1 wherein said motor is connected to a source of electric energy, said intermediate means comprising a train of speed reducing gears, an enlarged gear associated with an overriding clutch, and a friction clutch assembly serving to activate the main drive shaft, said motor alternatively operating through the train of reducing gears to produce a slow movement in the main drive shaft and said shelves, or through said enlarged gear to produce a fast movement.

3. Means as set forth in claim 2 in which said enlarged gear has a geared sector, and a cut out non-geared sector whereby the geared sector will be an active high speed power transfer element from the motor to the main driving shaft, and the cut out sector will be carried by the overriding clutch at low speed.

4. Means as set forth in claim 3 wherein said friction clutch assembly comprises a headed collar securely fastened to said main driving shaft, a freely rotatable gear on the neck of said collar, a compression spring, and a nut for compressing said spring and forcing said loosely mounted gear against said headed collar whereby to obtain an indirect connection between the train of gears and the conveying means, and a flexible connection between the train of gears and the loosely mounted gear.

5. Means for heating a food product formed from a plurality of substances comprising a casing, heating means within said casing, conveying means within said casing, a shelf removably secured to said conveying means, said conveying means being so constructed and arranged to move the food product so that the various substances of the food product are directly exposed to the heating means at different times; and wherein the conveying means comprises a flexible driving means, said flexible driving means operating through a closed rectangular path from a starting point, a series of carrier bolts secured to said chain at spaced intervals along its length, and shelves removably attached to said carrier bolts; and wherein an overriding clutch having a gear with a cut-out sector is provided whereby to provide alternatively a series of a slow stage of movement, followed by a fast stage of movement.

6. Means as set forth in claim 5 wherein said heating means comprises a series of heating coils per each cooking cycle, each coil of approximately 500 watts capacity connected together, and a reflector to direct the heat rays.

References Cited

UNITED STATES PATENTS 3,273,489   9/1966   Wilson _____ 99—443 X

FREDERICK L. MATTESON, Primary Examiner

E. G. FAVORS, Assistant Examiner

U.S. Cl. X.R,
99—443